(12) United States Patent
Sundrani (10) Patent No.: US 7,971,092 B2
(45) Date of Patent: Jun. 28, 2011

(54) METHODS AND DEVICES FOR HIGH PERFORMANCE CONSISTENCY CHECK

(75) Inventor: Kapil Sundrani, Bareilly (IN)

(73) Assignee: LSI Corporation, Milpitas, CA (US)

( * ) Notice: Subject to any disclaimer, the term of this patent is extended or adjusted under 35 U.S.C. 154(b) by 400 days.

(21) Appl. No.: 12/186,981

(22) Filed: Aug. 6, 2008

(65) Prior Publication Data

US 2010/0037019 A1 Feb. 11, 2010

(51) Int. Cl.
*G06F 11/00* (2006.01)
(52) U.S. Cl. .......................................... 714/6
(58) Field of Classification Search .............. 714/6, 718, 714/719, 819, 724, 763, 799, 805, 807, 7, 714/42, 48; 711/114
See application file for complete search history.

(56) References Cited

U.S. PATENT DOCUMENTS

| | | | | |
|---|---|---|---|---|
| 5,101,492 A * | 3/1992 | Schultz et al. | | 714/7 |
| 5,737,744 A * | 4/1998 | Callison et al. | | 711/114 |
| 5,809,224 A * | 9/1998 | Schultz et al. | | 714/7 |
| 5,809,280 A * | 9/1998 | Chard et al. | | 711/160 |
| 5,809,560 A * | 9/1998 | Schneider | | 711/204 |
| 5,822,584 A * | 10/1998 | Thompson et al. | | 718/103 |
| 5,961,652 A * | 10/1999 | Thompson | | 714/6 |
| 6,058,489 A * | 5/2000 | Schultz et al. | | 714/7 |
| 6,370,626 B1* | 4/2002 | Gagne et al. | | 711/154 |
| 7,296,135 B2* | 11/2007 | Thompson | | 711/201 |
| 7,620,844 B2* | 11/2009 | Mambakkam et al. | | 714/6 |
| 7,739,544 B2* | 6/2010 | Yamato et al. | | 714/7 |
| 2002/0069317 A1* | 6/2002 | Chow et al. | | 711/104 |
| 2002/0194528 A1* | 12/2002 | Hart | | 714/6 |

* cited by examiner

*Primary Examiner* — Phung M Chung
(74) *Attorney, Agent, or Firm* — Duft Bornsen & Fishman LLP

(57) ABSTRACT

Methods and devices for reading data from a plurality of storage devices belonging to a plurality of spans and checking consistency (e.g., XOR parity check) of data belonging to each span independently of another span in one embodiment. Methods and devices for reading data from a plurality of stripes and checking consistency of the data from the plurality of stripes in another embodiment.

18 Claims, 10 Drawing Sheets

METHODS AND DEVICES FOR HIGH PERFORMANCE CONSISTENCY CHECK

BACKGROUND

1. Field of the Invention

The invention relates generally to storage systems and more specifically relates to reading data from a plurality of storage devices belonging to a plurality of spans and checking data belonging to each span independently of another span.

2. Discussion of Related Art

Applications of information technology have become pervasive in our world. Computer environments that support these applications often use Redundant Array of Independent Disks ("RAID") technology in storage systems to achieve high performance, reliability, and/or larger storage capacities. A storage system generally includes a controller for interfacing with a host computer, as well as a plurality of storage devices arranged as one or more logical volumes that presents a range of data blocks onto which data is stored.

Frequently, the logical volume is arranged as one or more spans with the plurality of storage devices arranged into the one or more spans. A span can itself be seen as a logical volume. However, if there are multiple spans, the spans will together be exposed as a single logical volume through the controller. For example, a span may itself implement a RAID 5 volume, and a logical volume that consists of two such RAID 5 spans will be exposed as a RAID 50 volume through the controller. This is because when two RAID 5 spans are combined as a striped logical volume (i.e., data is split across two or more storage devices/volumes similar to RAID 0), a RAID50 volume is formed. Likewise, when two RAID 1, 1E, or 6 spans are combined, a RAID 10, 1E0, or 60 volume is formed.

Various techniques are implemented at these RAID levels to achieve high reliability. One such technique is consistency check, which is performed to verify integrity of data stored in a logical volume based on the RAID redundant information of the volume. The consistency check processing is typically performed within the storage system independently of and transparent to any attached host systems. A consistency check generally includes two steps. A first step involves reading data from storage devices of a single RAID span, and a second step involves checking the read data. The actual checking usually depends on the RAID level that is implemented. For example, a RAID 5 span may be read and XOR parity check may be performed. Conversely, a RAID 1 span may be read and the read data may be checked for being a mirrored set.

As noted above, a logical volume is frequently arranged as one or more spans. When a logical volume includes multiple spans, performing consistency check on the logical volume as presently practiced includes performing consistency check sequentially on each of the multiple spans. Thus, performing consistency check as presently practiced includes reading data belonging to a single first span and checking consistency of the data belonging to the single first span, then reading data belonging to a single second span and checking consistency of the data belonging to the single second span, etc.

As applications of information technology are becoming more pervasive, storage systems are also becoming more complicated and larger in size. Increased storage requirements often lead to larger number of spans used to define a logical volume. Each span is also becoming larger in size as capacity of each storage device (e.g., disk) increases. Accordingly, performing consistency check on a logical volume requires more processing time.

Thus it is an ongoing challenge to improve the performance of consistency checks.

SUMMARY

The present invention solves the above and other problems, thereby advancing the state of the useful arts, by providing methods and devices for reading data from a plurality of storage devices belonging to a plurality of spans and checking consistency (e.g., XOR parity check) of data belonging to each span independently of another span. Reading data from the plurality of storage devices belonging to the plurality of spans provides improved performance by overlapping parallel operation of multiple spans. Performance is improved because storage devices are typically the slowest devices in a storage system, and their impact on the overall system performance is lessened by making use of the plurality of storage devices simultaneously. Among other problems that are solved, methods and devices for reading data from a plurality of stripes and checking consistency of the data from the plurality of stripes are also provided. Reading data from the plurality of stripes provides improved performance by overlapping parallel operation of multiple stripes.

In one aspect hereof, a method is provided for checking consistency of a logical volume. The logical volume has multiple spans and each span has multiple storage devices. The method includes reading data from a plurality of storage devices belonging to a plurality of spans. The method also includes checking, in response to reading the data, consistency of data belonging to each span; the consistency of the data belonging to each span is checked independently of another span. The method further includes affecting an operation of the logical volume based in part on the consistency of the logical volume.

Another aspect hereof provides a device for checking consistency of a logical volume. The logical volume has multiple spans and each span has multiple storage devices. The device includes circuitry for reading data from a plurality of storage devices belonging to a plurality of spans. The device also includes circuitry for checking, in response to reading the data, consistency of data belonging to each span; the consistency of the data belonging to each span is checked independently of another span. The method further includes circuitry for affecting an operation of the logical volume based in part on the consistency of the logical volume.

Still another aspect hereof provides a method for checking consistency of a logical volume. The logical volume has multiple stripes. The method includes reading data from a plurality of stripes. The method also includes checking, in response to reading the data and prior to reading another data from another plurality of stripes, consistency of the data from the plurality of stripes. Additionally, the method includes reading, in response to checking the consistency of the data from the plurality of stripes and prior to checking yet another data from yet another plurality of stripes, data from the another plurality of stripes. The method further includes affecting an operation of the logical volume based in part on the consistency of the logical volume.

In these embodiments, similar components/features generally have similar reference labels. A reference label may include a primary label, a hyphen, and a sublabel. The similar components/features may be distinguishable by the sublabel. A reference to the primary label without the sublabel generally refers to any or all of the similar components/features.

DETAILED DESCRIPTION OF THE DRAWINGS

Figure 1:
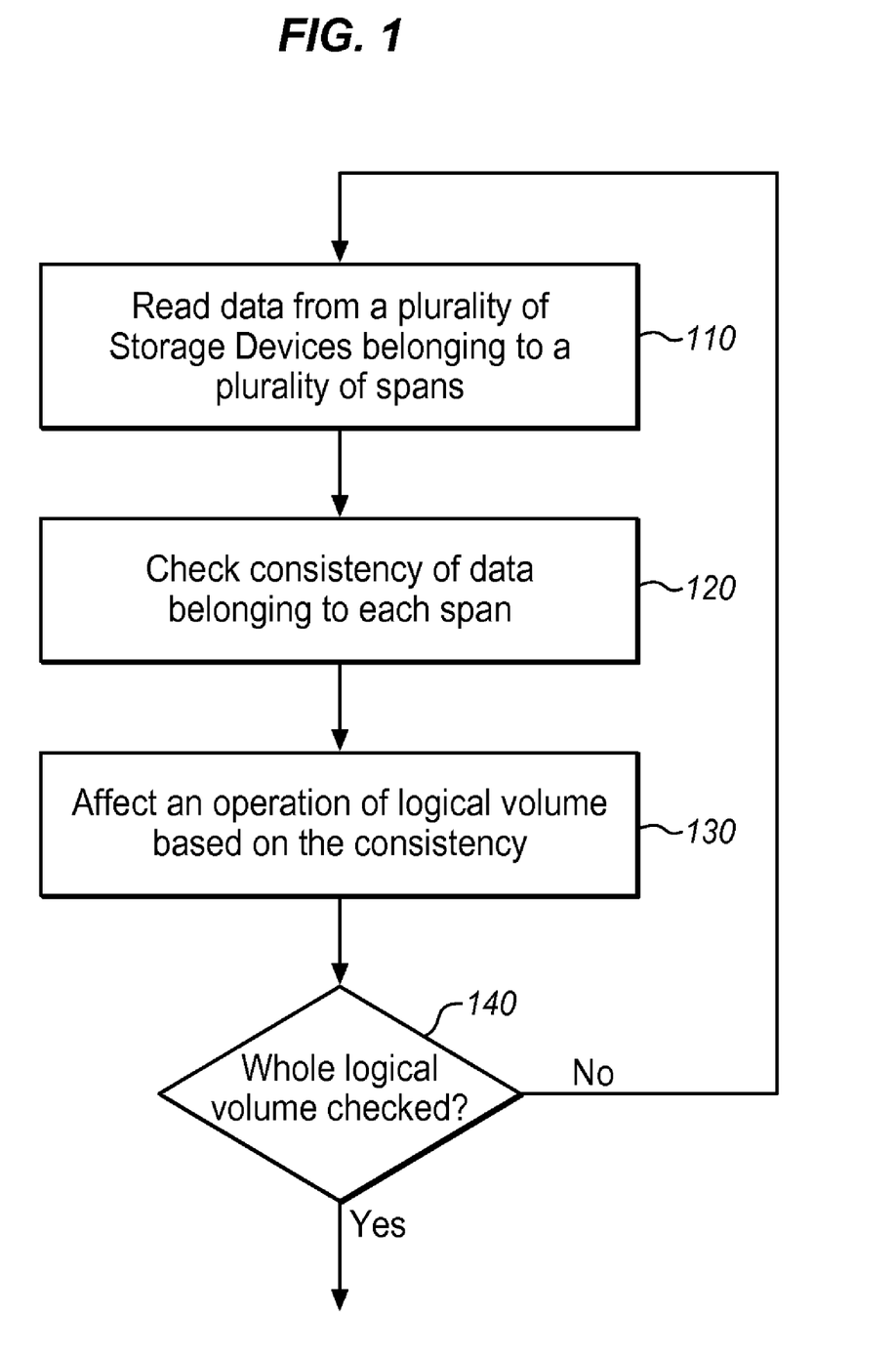
FIG. 1 is a flowchart describing an exemplary method in accordance with features and aspects hereof to check consistency of a logical volume.

FIG. 1 is a flowchart describing an exemplary method in accordance with features and aspects hereof to check consistency of a logical volume. At step 110, data is read from a plurality of storage devices belonging to a plurality of spans. In one exemplary embodiment, data is read from all storage devices of all spans in a logical volume in parallel. By contrast and as noted above, performing consistency check on the logical volume as previously practiced includes performing consistency check on a single first span of the logical volume, then performing consistency check on a single second span of the logical volume, etc. Thus as previously practiced, rather than reading data belonging to at least the first span and the second span prior to checking consistency, data belonging to the single first span would be read and checked prior to reading data belonging to the single second span, etc.

At step 120, consistency of data belonging to each span is checked in response to reading the data. The consistency of the data belonging to each span is checked independently of another span. In another exemplary embodiment, data belonging to each span is checked independently of all other spans. At step 130, an operation of the logical volume is affected based in part on the consistency of the logical volume as checked in step 120. As described further below, operation of the logical volume may be affected, for example, by correcting inconsistency of the checked data or by preventing further access to the checked data. Step 140 determines whether the whole logical volume has been checked. If so, consistency check is complete for the logical volume; if not, the method loops back to step 110.

Figure 2:
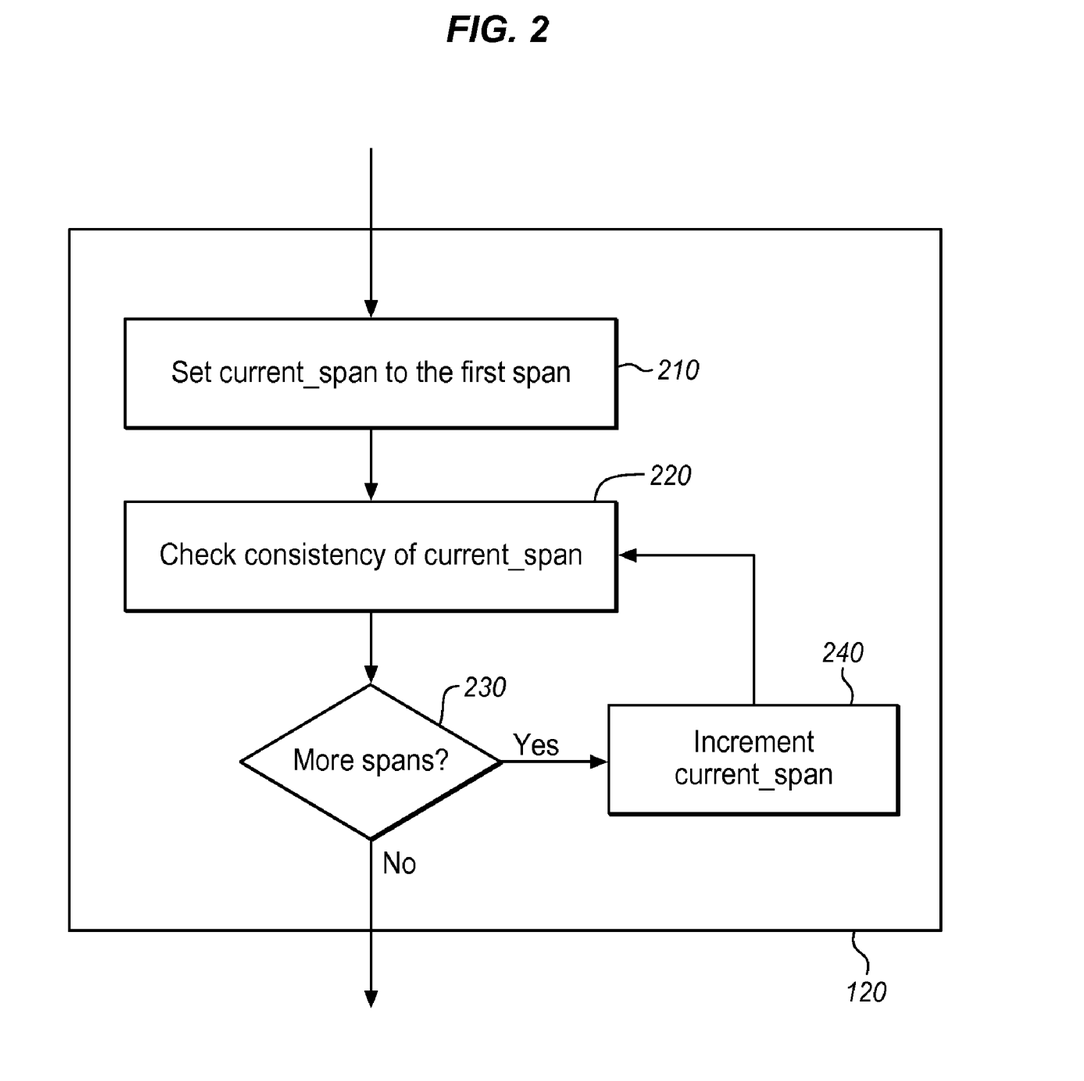
FIG. 2 is a flowchart describing exemplary additional details to check consistency of data belonging to each span that implements a RAID 1 volume, in accordance with features and aspects hereof.

FIG. 2 is a flowchart describing exemplary additional details of step 120 of FIG. 1 as may be applied to checking consistency of data read from a RAID 1 or 1E span. After having already read data from a plurality of storage devices belonging to a plurality of spans, a variable current_span is set to the first span at step 210 (for example, if the first span is identified as span number one, current_span would be set to one). Step 220 checks consistency of data belonging to the current_span. For example, performing XOR computation on a mirrored data set should result in zero. Step 230 determines whether there are more spans with data to be checked. If so, the variable current_span is incremented to the next span at step 240 and the method loops back to check data belonging to the next span. Otherwise, the loop through each span is terminated.

Figure 6:
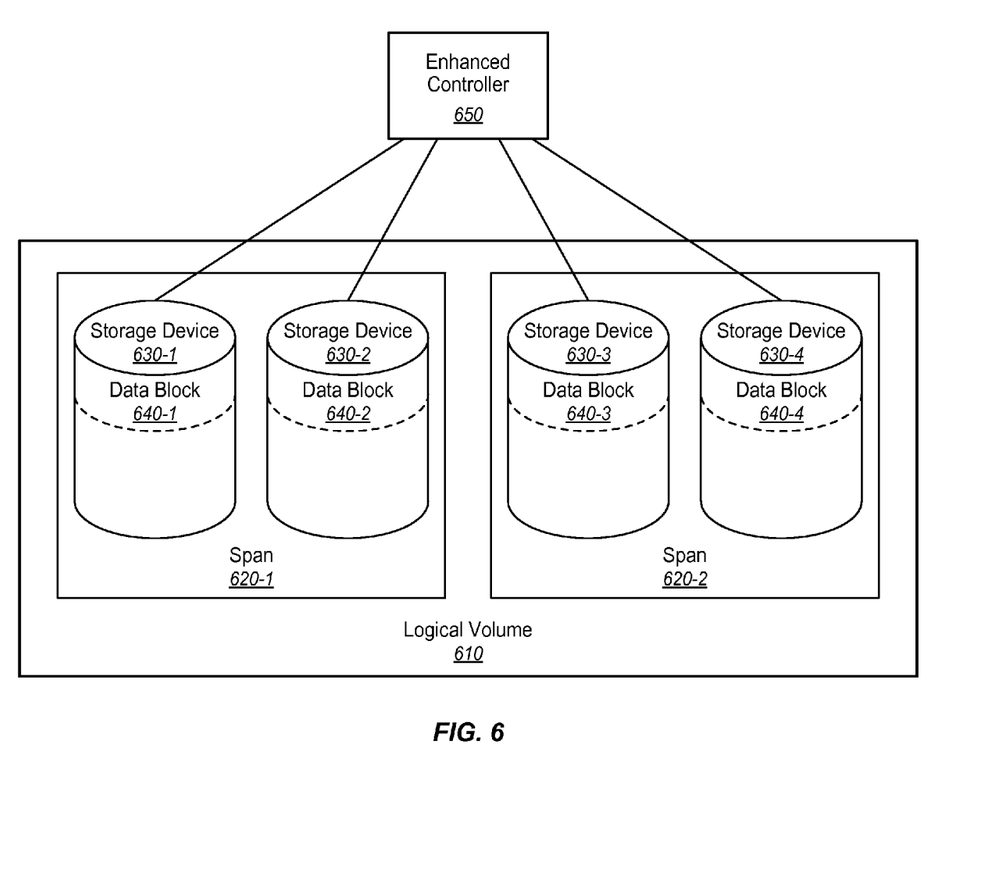
FIG. 6 is a block diagram of an exemplary storage system that includes two spans, each span implements a RAID 1 volume and has two storage devices, in accordance with features and aspects hereof.

The methods of FIGS. 1 and 2 are applicable to an exemplary storage system of FIG. 6. The exemplary storage system of FIG. 6 includes two spans, each span implements a RAID 1 volume and has two storage devices in accordance with features and aspects hereof. The exemplary storage system includes an enhanced controller 650 operable for checking consistency of a logical volume 610 having the two spans: a first span 620-1 and a second span 620-2. The first span 620-1 includes a first storage device 630-1 and a second storage device 630-2. A first data block 640-1 resides on the first storage device 630-1, and a second data block 640-2 resides on the second storage device 630-2. Similarly, the second span 620-2 includes a third storage device 630-3 and a fourth storage device 630-4. A third data block 640-3 resides on the third storage device 630-3, and a fourth data block 640-4 resides on the fourth storage device 630-4.

The enhanced controller 650 reads all data blocks, even though the data blocks belong to different spans. In response to reading the four data blocks 640, the enhanced controller 650 checks the former two data blocks that belong to the first span 620-1 as a mirrored set, and then checks the latter two data blocks that belong to the second span 620-2 as a mirrored set. For example, the data may be XOR'ed to verify a result of zero indicating the mirrored data is identical. Advantageously, reading the data blocks from all storage devices in parallel reduces delays and computation cycles when compared to reading the data blocks from spans sequentially. Meanwhile, the arrangement of the data blocks in different spans is still maintained because the former two data blocks are checked independently of the latter two data blocks.

Figure 3:
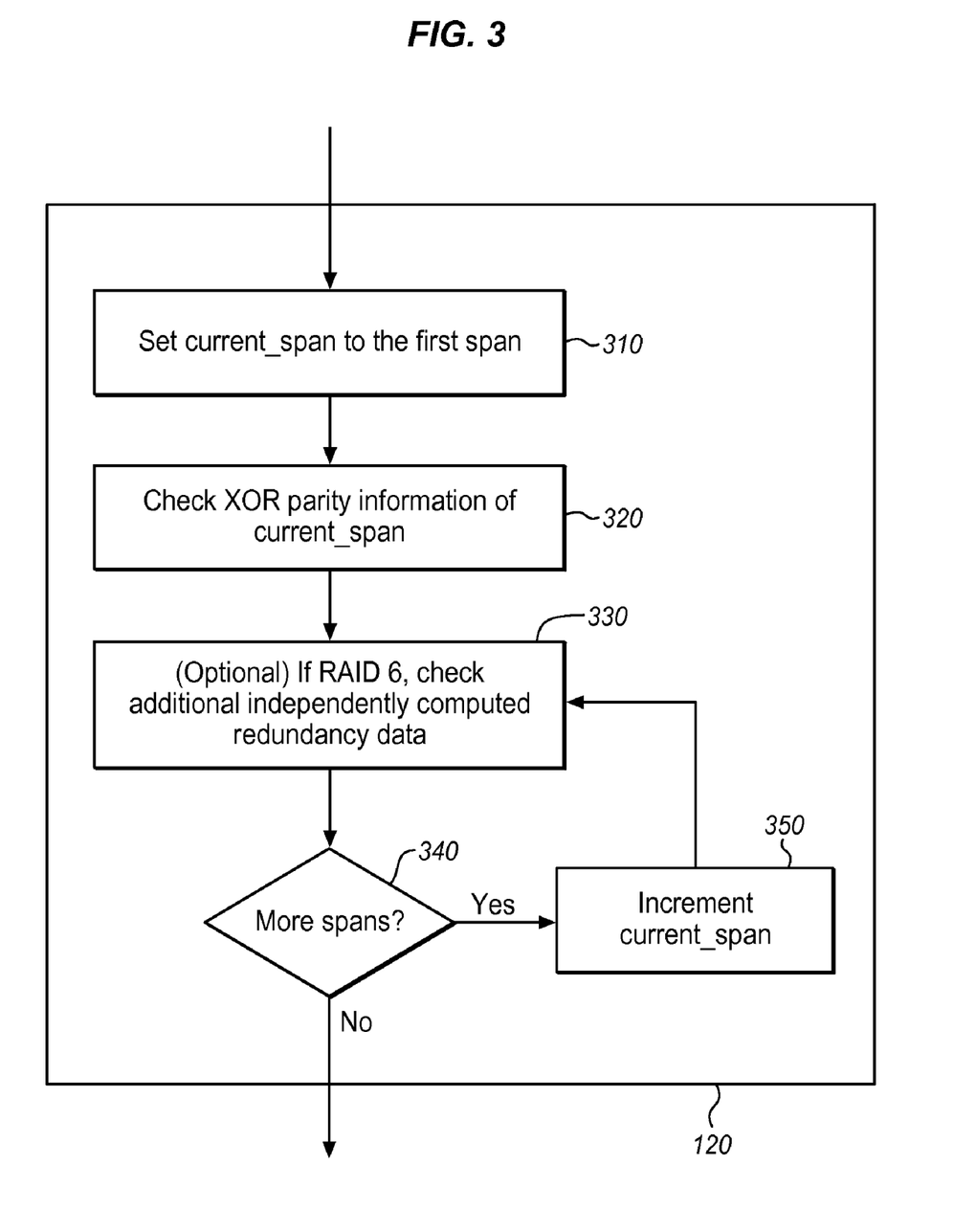
FIG. 3 is a flowchart describing exemplary additional details to check consistency of data belonging to each span that implements a RAID 5 volume or a RAID 6 volume, in accordance with features and aspects hereof.

FIG. 3 is a flowchart describing exemplary additional details of step 120 of FIG. 1 as may be applied to checking consistency of data read from a RAID 5 or RAID 6 span. After having already read data from a plurality of storage devices belonging to a plurality of spans, a variable current_span is set to the first span at step 310 (for example, if the first span is identified as span number one, current_span would be set to one). Step 320 performs XOR consistency check by checking XOR parity information for data belonging to the current_span. For example, the data may be XOR'ed to verify a result of zero indicating the data is consistent. If the span implements a RAID 6 volume, block 330 optionally checks additional independently computed redundancy data. Step 340 determines whether there are more spans with data to be checked. If so, the variable current_span is incremented to the next span at step 350 and the method loops back to check data belonging to the next span. Otherwise, the loop through each span is terminated.

Figure 7:
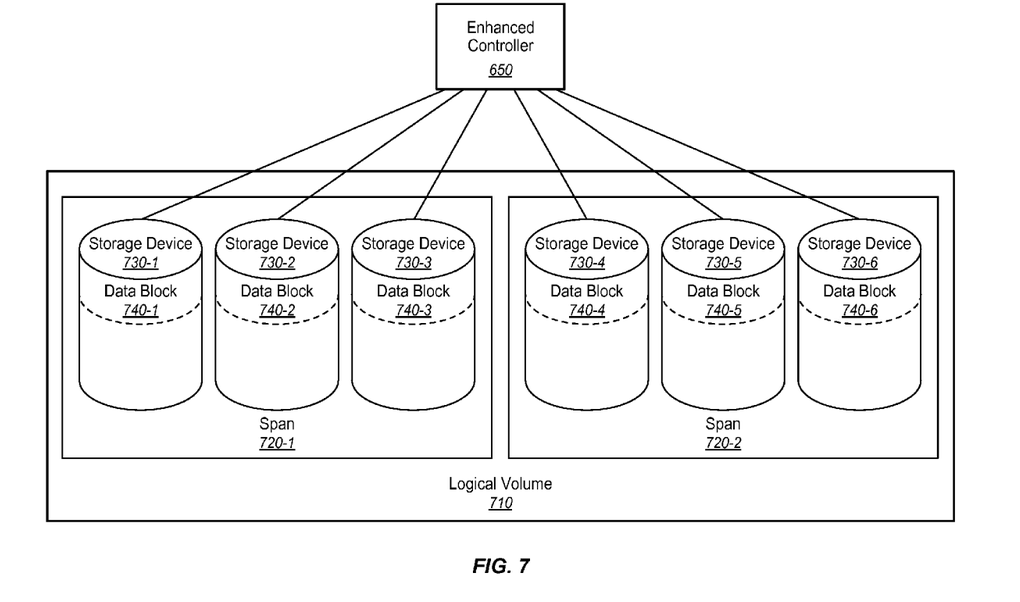
FIG. 7 is a block diagram of an exemplary storage system that includes two spans, each span implements a RAID 5 volume and has three storage devices, in accordance with features and aspects hereof.

The methods of FIGS. 1 and 3 are applicable to an exemplary storage system of FIG. 7. The exemplary storage system of FIG. 7 includes two spans, each span implements a RAID 5 volume or a RAID 6 volume and has three storage devices in accordance with features and aspects hereof. The exemplary storage system includes an enhanced controller 650 operable for checking consistency of a logical volume 710 having the two spans: a first span 720-1 and a second span 720-2. The first span 720-1 includes a first storage device 730-1, a second storage device 730-2, and a third storage device 730-3. A first data block 740-1 resides on the first storage device 730-1, a second data block 740-2 resides on the second storage device 730-2, and a third data block 740-3 resides on the third storage device 740-3. Similarly, the second span 720-2 includes a fourth storage device 730-4, a fifth storage device 730-5, and a sixth storage device 730-6. A fourth data block 740-4 resides on the fourth storage device 730-3, a fifth data block 740-5 resides on the fifth storage device 730-5, and a sixth data block 740-6 resides on the sixth storage device 740-6.

The enhanced controller 650 reads all data blocks, even though the data blocks belong to different spans. In response to reading the six data blocks 740, the enhanced controller 650 checks the former three data blocks that belong to the first span 720-1 (e.g., by performing XOR parity check), and then checks the latter three data blocks that belong to the second span 720-2 (e.g., by performing XOR parity check). Advantageously, reading the data blocks from all storage devices in parallel reduces delays and computation cycles when compared to reading the data blocks from spans sequentially. Meanwhile, the arrangement of the data blocks in different spans is still maintained because the former three data blocks are checked independently of the latter three data blocks.

Figure 4:
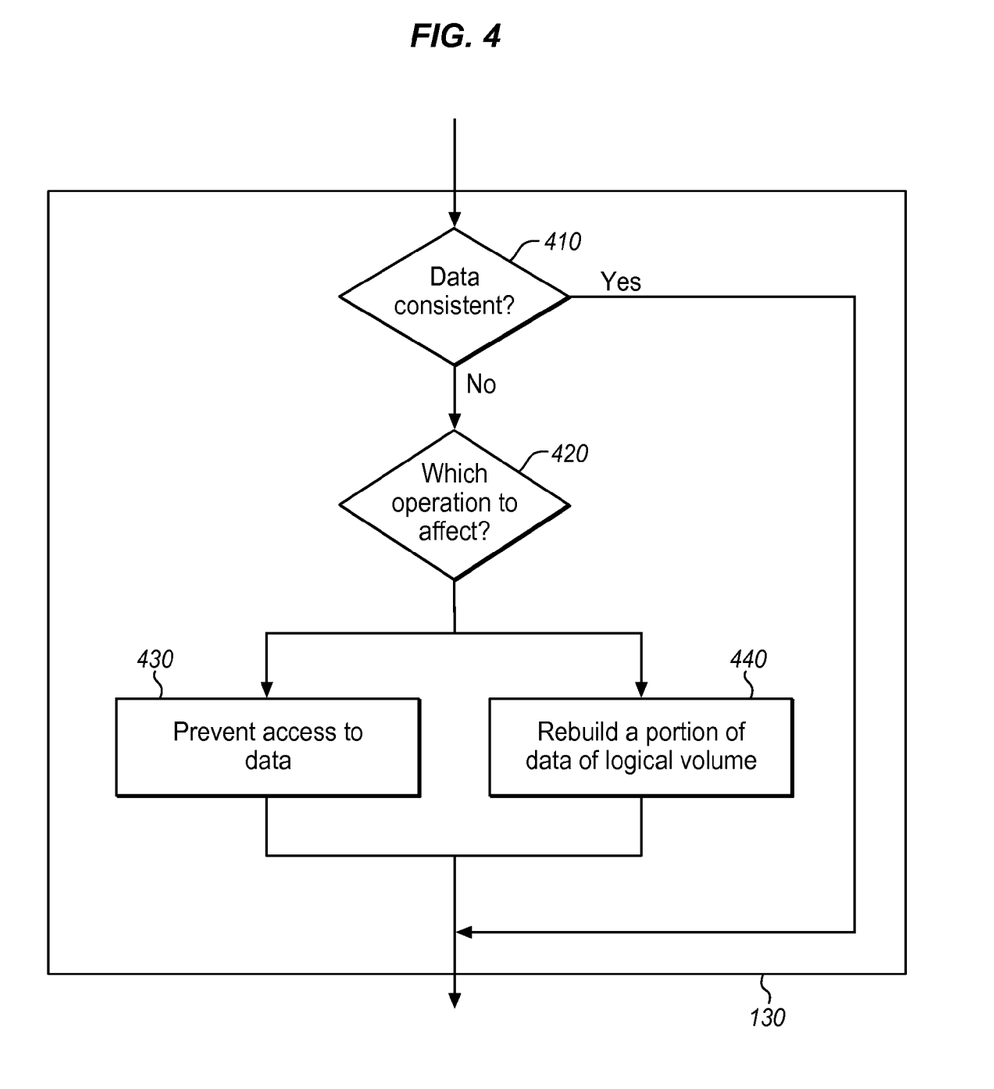
FIG. 4 is a flowchart describing exemplary additional details to affect an operation of the logical volume based on the consistency, in accordance with features and aspects hereof.

FIG. 4 is a flowchart describing exemplary additional details of step 130 of FIG. 1 to affect an operation of the logical volume in accordance with features and aspects hereof. Step 410 determines whether data is consistent. If so, the operation of the logical volume is not affected. Otherwise, step 420 determines which operation of the logical volume is to be affected. The particular operation to affect may have been set during manufacturing and/or by a user. Based on the determination, access to a portion of data of a plurality of storage devices is prevented at step 430, and/or a portion of data of the logical volume is rebuilt at step 440 to correct inconsistency.

Figure 5:
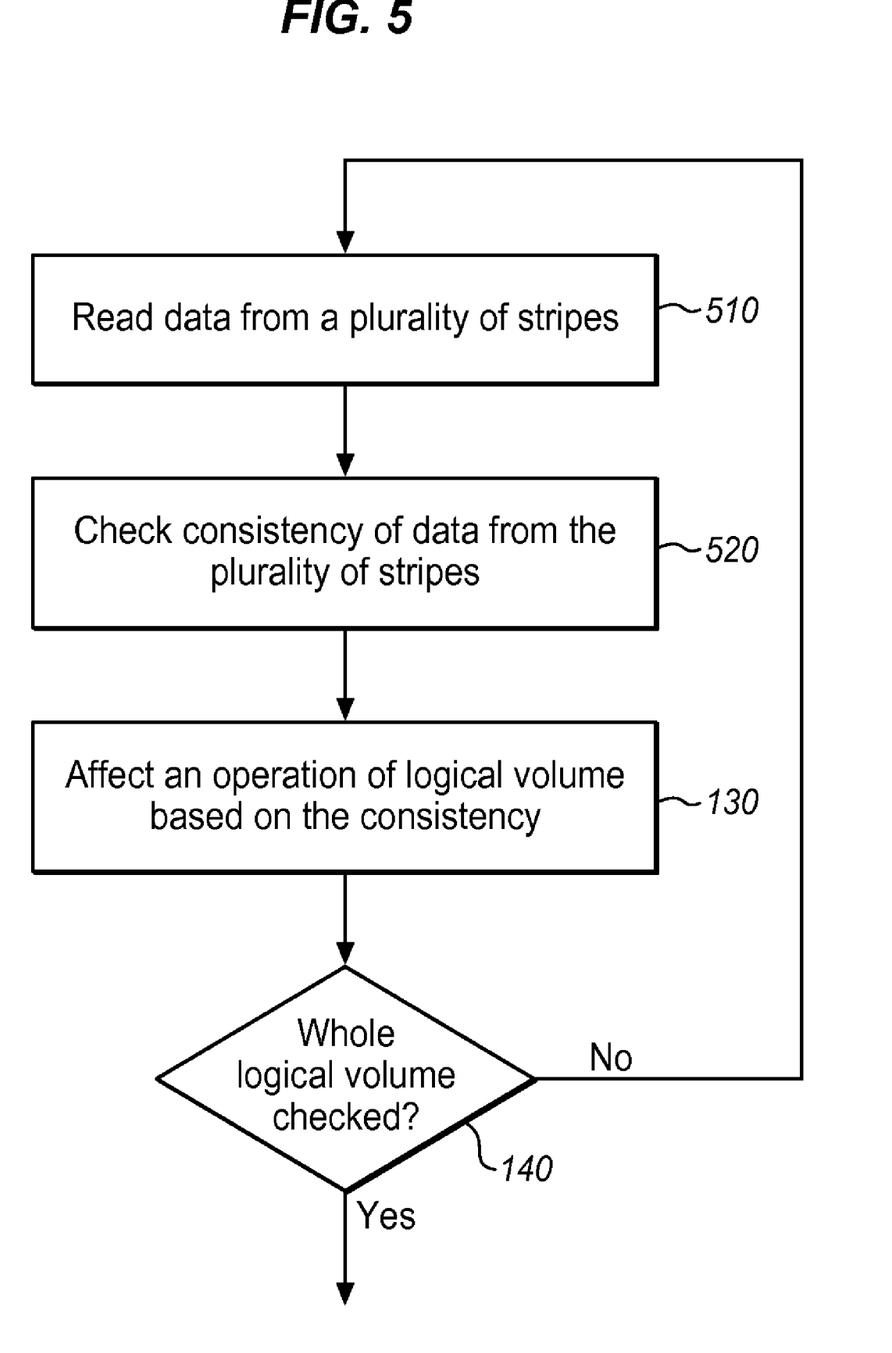
FIG. 5 is a flowchart describing an exemplary method in accordance with features and aspects hereof to check consistency of a striped logical volume.

FIG. 5 is a flowchart describing a method in accordance with features and aspects hereof to check consistency of a striped logical volume. A "striped logical volume" broadly includes logical volumes having data segments that are stored onto multiple storage devices in the logical volume. Accordingly, a "stripe" broadly includes data segments that are stored onto multiple storages devices. At step 510, data is read from a plurality of stripes. By contrast, performing consistency check on the striped logical volume as previously practiced includes performing consistency check on a single first stripe of the logical volume, then performing consistency check on a single second stripe of the logical volume, etc. Thus as previously practiced, rather than reading data belonging to at least the first stripe and the second stripe prior to checking consistency, data belonging to the single first stripe would be read and checked prior to reading data belonging to the single second stripe, etc.

Step 520 checks consistency of the data from the plurality of stripes in response to reading the data. Additionally, the consistency is checked prior to reading another data from another plurality of stripes. Step 130 affects an operation of the logical volume based in part on the consistency of the logical volume as described in FIG. 4. Step 140 determines whether the whole logical volume has been checked. If so, consistency check is complete for the logical volume. If not, the method loops back to step 510 to read another data from another plurality of stripes.

Those of ordinary skill in the art will readily recognize numerous additional and equivalent steps that may be performed in the methods of FIGS. 1 through 5. Such additional and equivalent steps are omitted herein merely for brevity and simplicity of this discussion.

Figure 8:
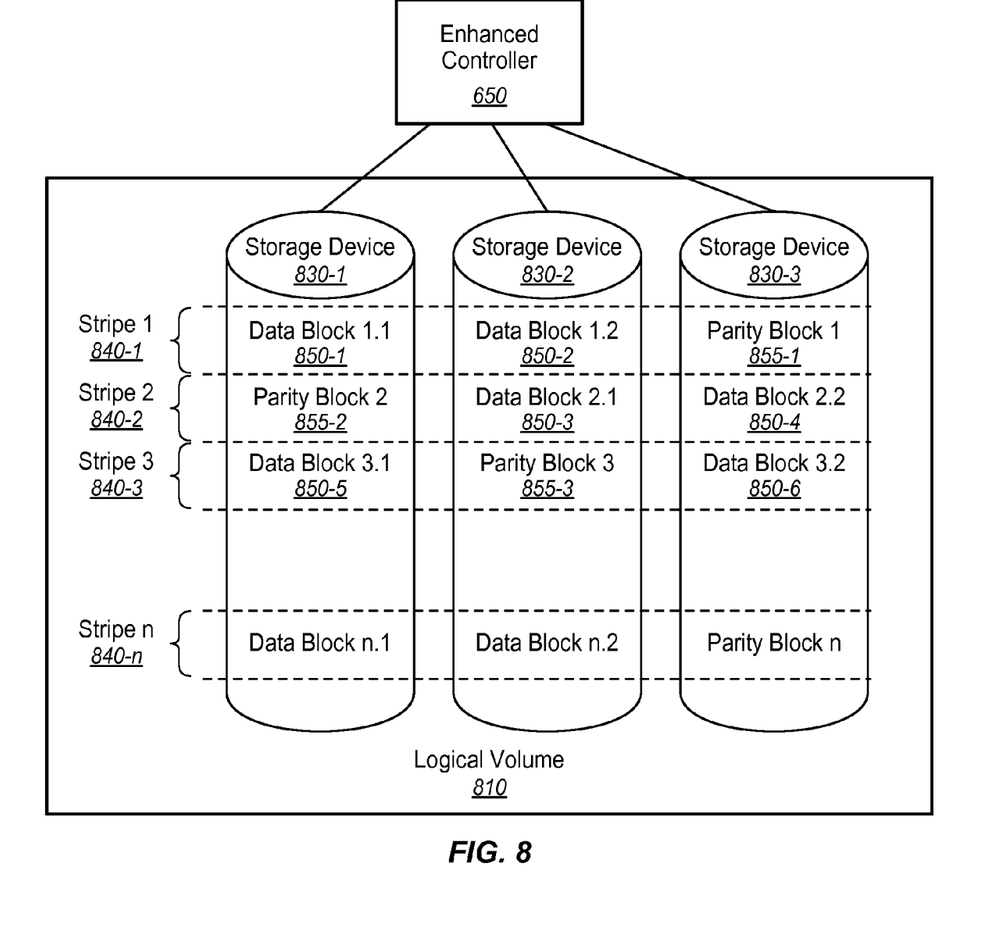
FIG. 8 is a block diagram of an exemplary storage system that includes a striped logical volume, in accordance with features and aspects hereof.

The method of FIG. 5 is applicable to an exemplary storage system of FIG. 8 that includes a striped logical volume. The exemplary storage system of FIG. 8 implements a RAID 5 volume and has three storage devices in accordance with features and aspects hereof. The exemplary storage system includes an enhanced controller 650 operable for checking consistency of a logical volume 810 having the three storage devices: a first storage device 830-1, a second storage device 830-2, and a third storage device 830-3. The logical volume 810 has three stripes 840. Stripe 1 (840-1) includes data block 1.1 (850-1) residing on the first storage device 830-1, data block 1.2 (850-2) residing on the second storage device 830-2, and parity block 1 (855-1) residing on the third storage device 830-3. Stripe 2 (840-2) includes parity block 2 (855-2) residing on the first storage device 830-1, data block 2.1 (850-3) residing on the second storage device 830-2, and data block 2.2 (850-4) residing on the third storage device 830-3. Stripe 3 (840-3) includes data block 3.1 (850-5) residing on the first storage device 830-1, parity block 3 (855-3) residing on the second storage device 830-2, and data block 3.2 (850-6) residing on the third storage device 830-3. In general, stripe n (840-n) includes data block n.1, data block n.2, and parity block n that reside on their respective storage devices.

The enhanced controller 650 reads a plurality of stripes rather than a single stripe prior to checking consistency. For example, the enhanced controller 650 reads at least the data blocks 850-1 850-2 850-3 850-4 and parity blocks 855-1 855-2 of both stripe 1 (840-1) and stripe 2 (840-2). In response to reading the two stripes 840-1 840-2 and prior to reading data blocks 850-5 850-6 and parity block 855-3 of stripe 3 (840-3), the data within stripe 1 (840-1) is checked (e.g., by performing XOR parity check), and the data within stripe 2 (840-2) is also checked. Advantageously, reading data from a plurality of stripes in parallel reduces delays and computation cycles when compared to reading the data from stripes sequentially. Meanwhile, the arrangement of data in each stripe is still maintained.

Figure 9:
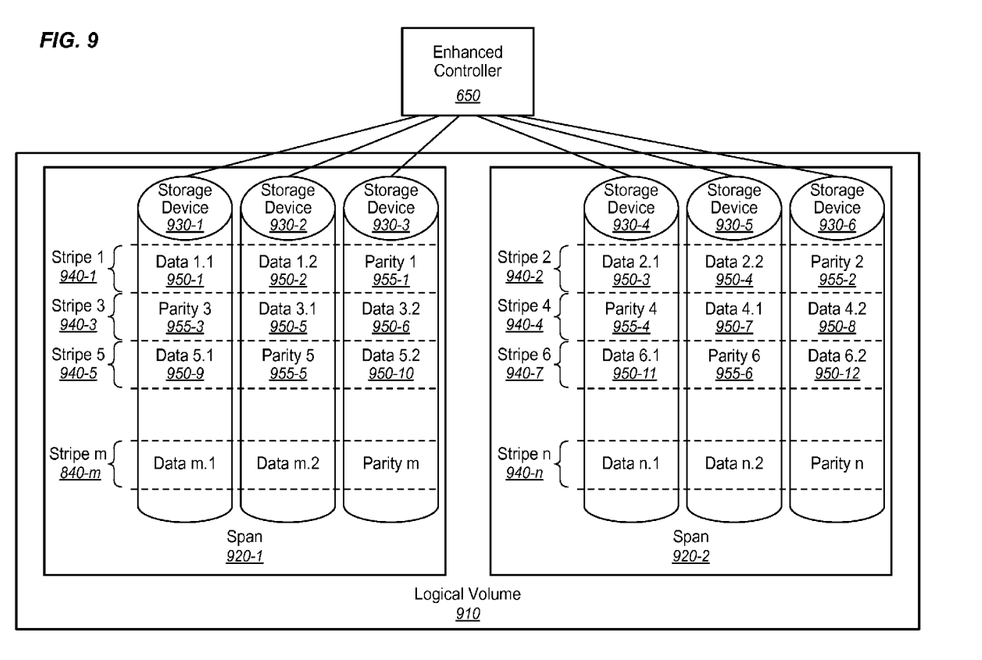
FIG. 9 is a block diagram of an exemplary storage system that includes two striped spans, in accordance with features and aspects hereof.

FIG. 9 is a block diagram of an exemplary storage system that includes two striped spans, in accordance with features and aspects hereof. The exemplary storage system includes an enhanced controller 650 operable for checking consistency of a logical volume 910 having the two spans: a first span 920-1 and a second span 920-2. Each of the two spans 920 implements a RAID 5 volume and has three storage devices for a total of six storage devices. Each of the two spans 920 has three strips 940 for a total of six stripes. Stripe 1 (940-1) on the first span 920-1 includes data block 1.1 (950-1) residing on a first storage device 930-1, data block 1.2 (950-2) residing on a second storage device 930-2, and parity block 1 (955-1) residing on a third storage device 930-3. Stripe 2 (940-2) on the second span 920-2 includes data block 2.1 (950-3) residing on a fourth storage device 930-3, data block 2.2 (950-4) residing on a fifth storage device 930-5, and parity block 2 (955-2) residing on a sixth storage device 930-6.

Additionally, stripe 3 (940-3) on the first span 920-1 includes parity block 3 (955-3) residing on the first storage device 930-1, data block 3.1 (950-5) residing on the second storage device 930-2, and data block 3.2 (950-6) residing on the third storage device 930-3. Stripe 4 (940-4) on the second span 920-2 includes parity block 4 (955-4) residing on the fourth storage device 930-1, data block 4.1 (950-7) residing on the fifth storage device 930-5, and data block 4.2 (950-8) residing on the sixth storage device 930-6. Stripe 5 (940-5) on the first span 920-1 includes data block 5.1 (950-9) residing on the first storage device 930-1, parity block 5 (955-5) residing on the second storage device 930-2, and data block 5.2 (950-10) residing on the third storage device 930-3. Stripe 6 (940-6) on the second span 920-2 includes data block 6.1 (950-11) residing on the fourth storage device 930-1, parity block 6 (955-6) residing on the fifth storage device 930-5, and data block 6.2 (950-12) residing on the sixth storage device 930-6. In general, stripe m (940-m) on the first span includes data block m.1, data block m.2, and parity block m that reside on their respective storage devices; and stripe n (940-n) on the second span 920-2 includes data block n.1, data block n.2, and parity block n that reside on their respective storage devices The enhanced controller 650 reads a stripe from each of the plurality of spans prior to checking consistency. For example, the enhanced controller 650 may read stripe 1 (940-1) from the first span 920-1, and stripe 2 (940-2) from the second span 920-2. The enhanced controller 650 may also read stripe 3 (940-3) from the first span 920-1, and stripe 4 (940-4) from the second span 920-2. Additionally, the enhanced controller 650 may read a plurality of stripes from each of the plurality of spans prior to checking consistency. For example, the enhanced controller 650 may read stripe 1 (940-1) and stripe 3 (940-3) from the first span 920-1, and stripe 2 (940-2) and stripe 4 (940-4) from the second span. Advantageously, reading data from a plurality of spans and stripes in parallel reduces delays and computation cycles when compared to reading the data from spans and stripes sequentially. Meanwhile, the arrangement of data in each stripe of each span is still maintained.

Figure 10:
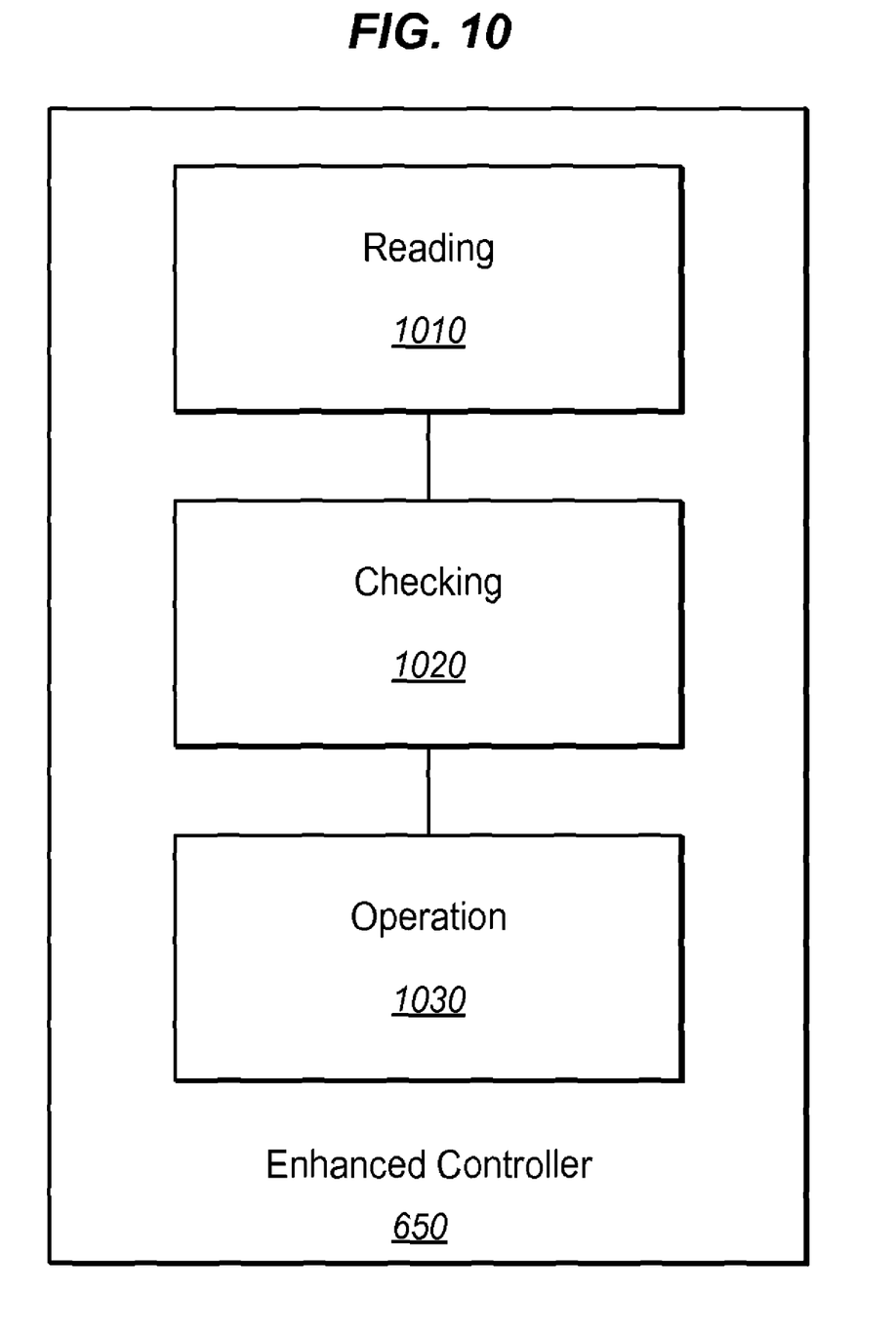
FIG. 10 is a block diagram of an exemplary enhanced controller that includes a reading element, a checking element, and an operation element, in accordance with features and aspects hereof.

FIG. 10 is a block diagram of an exemplary enhanced controller 650 that includes a reading element 1010, a checking element 1020, and an operation element 1030, in accordance with features and aspects hereof. Each of the elements may be implemented based on a microcontroller or a general purpose processor executing instructions, and/or circuitry implemented in Field-Programmable Gate Array ("FPGA") or Application-Specific Integrated Circuit ("ASIC"), etc. In some instances, the checking element 1020 may be capable of performing multiple checks simultaneously. For example, the checking element 1020 may include multiple XOR engines for performing XOR computations simultaneously. In these instances, not only can data be read from a plurality of storage devices in parallel, but the read data can also be checked in parallel to further improve performance.

Those of ordinary skill in the art will readily recognize numerous additional and equivalent components and modules within a fully functional storage system. Such additional and equivalent components are omitted herein for simplicity and brevity of this discussion. Thus, the structures of FIGS. 6 through 10 are intended merely as a representative of exemplary embodiments of features and aspects hereof to check consistency of a logical volume.

While the invention has been illustrated and described in the drawings and foregoing description, such illustration and description is to be considered as exemplary and not restrictive in character. One embodiment of the invention and minor variants thereof have been shown and described. Protection is desired for all changes and modifications that come within the spirit of the invention. Those skilled in the art will appreciate variations of the above-described embodiments that fall within the scope of the invention. As a result, the invention is not limited to the specific examples and illustrations discussed above, but only by the following claims and their equivalents.

What is claimed is:

1. A method for checking consistency of a logical volume comprising a plurality of spans, each span comprising a plurality of storage devices in a Redundant Array of Independent Disks ("RAID") configuration, the method comprising:
    reading data in parallel from a plurality of storage devices belonging to a plurality of spans;
    checking in parallel, in response to reading the data, consistency of data belonging to each span, wherein the consistency of the data belonging to each span is checked independently of another span; and
    affecting an operation of the logical volume based in part on the checked consistency, wherein the step of affecting comprises at least one of:
        preventing access to data of the logical volume that is inconsistent, rebuilding data of the logical volume that is inconsistent, or storing, in a memory, information identifying data of the logical volume that is inconsistent.

2. The method of claim 1, wherein:
    each span includes at least one of a RAID 1 volume, a RAID 1E volume, a RAID 5 volume, and a RAID 6 volume; and
    the logical volume includes one of a RAID 10 volume, a RAID 1E0 volume, a RAID 50 volume, and a RAID 60 volume.

3. The method of claim 1, wherein the step of reading comprises reading data of two spans, wherein each span of the two spans includes two physical storage devices.

4. The method of claim 1, wherein the step of reading comprises:
    reading a first data block from a first storage device belonging to a first span;
    reading a second data block from a second storage device belonging to the first span;
    reading a third data block from a third storage device belonging to a second span; and
    reading a fourth data block from a fourth storage device belonging to the second span.

5. The method of claim 1, wherein the step of reading comprises:
    reading a first data block from a first storage device;
    reading a second data block from a second storage device;
    reading a third data block from a third storage device; and
    reading a fourth data block from a fourth storage device.

6. The method of claim 5, wherein the step of checking comprises:
    checking, independent of the third data block and the fourth data block, consistency of the first data block and the second data block; and
    checking, independent of the first data block and the second data block, consistency of the third data block and the fourth data block.

7. The method of claim 1, wherein the consistency is data consistency.

8. The method of claim 1, wherein each span includes XOR parity information, and wherein the step of checking comprises checking XOR consistency.

9. The method of claim 1, wherein each span includes a striped logical volume, and wherein the step of reading comprises reading a stripe from each of the plurality of spans.

10. A device for checking consistency of a logical volume comprising a plurality of spans, each span comprising a plurality of storage devices in a Redundant Array of Independent Disks ("RAID") configuration, the device comprising:
- a reading element adapted for reading data in parallel from a plurality of storage devices belonging to a plurality of spans;
- a checking element adapted for checking in parallel, in response to reading the data, consistency of data belonging to each span, wherein the consistency of the data belonging to each span is checked independently of another span; and
- an operation element adapted for affecting an operation of the logical volume based in part on the checked consistency, wherein the affecting comprises at least one of:
  - preventing access to data of the logical volume that is inconsistent, rebuilding data of the logical volume that is inconsistent, or storing, in a memory, information identifying data of the logical volume that is inconsistent.

11. The device of claim 10, wherein:
- each span includes at least one of a RAID 1 volume, a RAID 1E volume, a RAID 5 volume, and a RAID 6 volume; and
- the logical volume includes one of a RAID 10 volume, a RAID 1E0 volume, a RAID 50 volume, and a RAID 60 volume.

12. The device of claim 10, wherein the reading element is adapted to:
- read data of two spans, wherein each span of the two spans includes two physical storage devices; and
- read a first data block from a first storage device, a second data block from a second storage device, a third data block from a third storage device, and a fourth data block from a fourth storage device.

13. The device of claim 12, wherein the first data block and the second data block belong to a first span, and the third data block and the fourth data block belong to a second span.

14. The device of claim 12, wherein the checking element is further adapted to:
- check a first consistency of the first data block and the second data block, wherein the first consistency is checked independent of the third data block and the fourth data block; and
- check a second consistency of the third data block and the fourth data block, wherein the second consistency is checked independent of the first data block and the second data block.

15. The device of claim 10, wherein the checking element is further adapted for checking consistency of data belonging to each span simultaneously, wherein the consistency of the data belonging to each span is checked independently and in parallel of another span.

16. A method for checking consistency of a logical volume comprising a plurality of stripes stored on a plurality of spans, each span comprising a plurality of storage devices in a Redundant Array of Independent Disks ("RAID") configuration, the method comprising:
- for each span, reading a stripe of the logical volume stored on the span, wherein the reading of a stripe for each span is performed in parallel;
- checking consistency of data of each of the stripes that has been read, wherein the checking of consistency of data of each of the stripes that has been read is performed in parallel;
- affecting an operation of the logical volume based in part on the checked consistency, wherein the step of affecting comprises at least one of:
  - preventing access to data of the logical volume that is inconsistent, rebuilding data of the logical volume that is inconsistent, or storing, in a memory, information identifying data of the logical volume that is inconsistent.

17. The method of claim 16, wherein reading the data of a stripe for each span comprises:
- reading the data of the stripe in parallel from each storage device of the span that the stripe resides upon.

18. The method of claim 16, wherein the step of reading comprises reading all storage devices in the logical volume.

* * * * *